Patented Apr. 8, 1952

2,591,735

UNITED STATES PATENT OFFICE 2,591,735

MANUFACTURE OF HYDRAZINE

Ernest Solomon, Nutley, N. J., assignor to The M. W. Kellogg Company, Jersey City, N. J., a corporation of Delaware No Drawing. Application December 29, 1950, Serial No. 203,567

11 Claims. (Cl. 23—190)

This invention relates to the manufacture of hydrazine. In one aspect, the invention relates to a process for the manufacture of hydrazine from ketones. One of the objects of the invention is to provide an efficient process for the manufacture of hydrazine. Another object of the invention is to provide an efficient process for the manufacture of hydrazine from readily available materials. Other objects and advantages inherent in the invention will become apparent from the following description.

According to this invention, the manufacture of hydrazine is accomplished, generally, under conditions as more fully hereinafter disclosed, by first reacting a substituted ketone with a nitrosating agent to produce the corresponding bimolecular nitroso ketone. The bimolecular nitroso ketone, thus produced, is next reduced, under the operating conditions hereinafter described, to form a product comprising hydrazine and a substituted ketone having the same formula as the substituted ketone starting material. Hydrazine is then separated from the product obtained by the above hydrogenation as a product of the process. The term "hydrazine" is employed for the sake of convenience, but is intended to include not only hydrazine itself, but also hydrazine hydrate.

The substituted ketone employed as the starting material is one having the general formula:

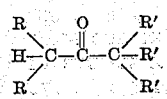

in which R and R' are substituted or unsubstituted alkyl, aryl or naphthyl groups and not more than two R' may also be a H atom. Suitable substituted ketones are di-isopropyl ketone, methyl isopropyl ketone, 1,1-diphenyl acetone or sym-dicyclohexyl acetone.

The nitrosation of the substituted ketone to form the corresponding bimolecular nitroso ketone may be carried out with such nitrosating agents as nitrous acid; ethyl nitrite in the presence of a mineral acid such as hydrochloric acid, nitrosyl chloride or oxides of nitrogen. These nitrosating agents are employed as liquids, solids or gases, depending upon the state in which the materials are ordinarily available. The intermediate bimolecular nitroso ketone has the following general formula, in which proper substituents may be inserted for R and R', as indicated in the following general formula for the substituted ketone:

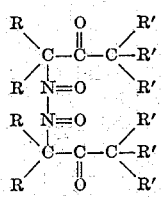

The reaction of the substituted ketone with the nitrosating agent to produce the corresponding bimolecular nitroso ketone as an intermediate product in the process, may be represented as follows (Reaction A) in which di-isopropyl ketone and nitrous acid are employed as typical reactants:

Reaction A:

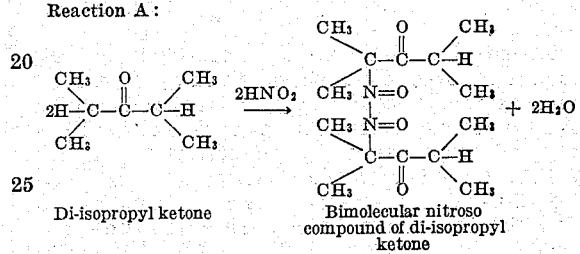

Di-isopropyl ketone    Bimolecular nitroso compound of di-isopropyl ketone

The aforementioned nitrosation of the substituted ketone may be carried out in a suitable reaction vessel in which nitrosation is accomplished by simple admixture of the selected reactants. Certain nitrosating agents are obtained in the gaseous state, for example, gaseous ethyl nitrite. Where such is the case, the gaseous nitrosating agent is passed into a suitable reaction vessel such as a flask, in which is contained the substituted ketone in an acid medium. Thus, one mol of gaseous ethyl nitrite per mol of di-isopropyl ketone, by weight, in admixture with from 10 to 20% by weight of concentrated hydrochloric acid based on ethyl nitrite, may be reacted to produce the corresponding bimolecular nitroso ketone. The nitration reaction is carried out at room temperature or slightly above, with temperatures below about 50° C. being preferred. Nitrosation is found to be complete by a continuous color change taking place in the product in the reaction vessel from a clear solution to a characteristic blue or green coloration. In some instances, slight heating of the contents in the reaction vessel is required to make this color change apparent.

In carrying out the nitrosation of the substituted ketone, it may be desirable to form the intermediate corresponding bimolecular nitroso ketone in the presence of an inert solvent. Since the nitrosation reaction is exothermic, the addition of inert solvents to the aforementioned reactants produces a dilute system, so that the rate of reaction may be reduced by proper temperature control. The temperature may be controlled by refluxing at the boiling point of the solvent. By thus reducing the rate of reaction, the formation of any undesirable by-products as a result of too fast reaction rates is avoided. Suitable inert solvents that may be added to the reactants in the nitration reaction vessel are chloroform, benzene, carbon tetrachloride, toluene or hexane.

The bimolecular nitroso ketone produced as an intermediate product in the process by the above nitrosation of the substituted ketone, is next separated from the products of nitrosation. This may be accomplished by chilling the mixture to a temperature sufficiently low to crystallize the intermediate product. The proper temperature thus employed will depend not only upon the solubility (and indirectly on the melting point) of the intermediate product produced, but also to some extent upon the presence or absence of any inert solvents that may be employed, as indicated above, for carrying out the aforementioned nitrosation step. However, a temperature below at least 0° C. is ordinarily sufficient to effect the aforementioned crystallization of the intermediate product, with a temperature between about −10° C. and about −20° C. or even lower, being preferred. Following the aforementioned crystallization, the intermediate bimolecular nitroso ketone is obtained as a solid phase and the remaining products of nitrosation, which may include solvent, are obtained as a liquid phase. This solid phase is next filtered from the chilled product.

As indicated above, the intermediate bimolecular nitroso ketone product obtained by the aforementioned nitrosation step, is next reduced to form a product comprising hydrazine and a substituted ketone having the same formula as the substituted ketone starting material. This reaction may be represented as follows (Reaction B), in which the intermediate bimolecular nitroso ketone, having the aforementioned general formula, is reduced to produce hydrazine and the substituted ketone starting material.

Reaction B:

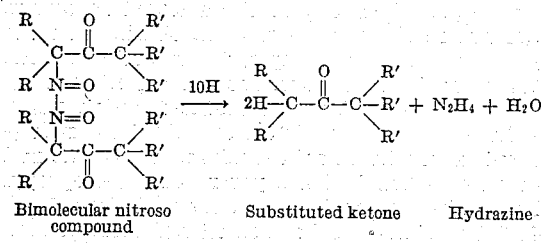

Bimolecular nitroso compound     Substituted ketone     Hydrazine

Where di-isopropyl ketone is the starting material, the intermediate bimolecular nitroso compound, indicated in Reaction A above, may be reduced to produce hydrazine and the di-isopropyl ketone starting material, as indicated in Reaction C:

Reaction C:

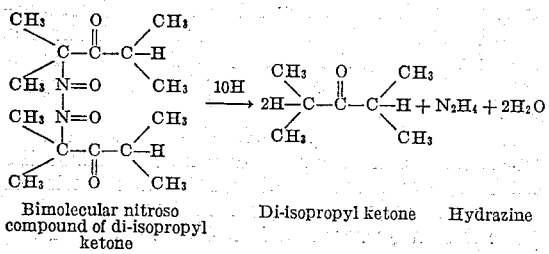

Bimolecular nitroso compound of di-isopropyl ketone     Di-isopropyl ketone     Hydrazine The reduction by hydrogenation of the intermediate bimolecular nitroso compound is carried out in a suitable reactor or reaction vessel, with or without a hydrogenation catalyst, at a temperature below about 35° C. Temperatures between about 0° C. and about 20° C. are preferred. The pressure employed is about atmospheric pressure, although sub-atmospheric or elevated pressures may also be employed. If hydrogenation is conducted in the presence of a catalyst, such catalysts may comprise nickel, cobalt or iron, either supported or unsupported. If catalytic hydrogenation is employed, it is desirable to conduct the hydrogenation in the presence of a low boiling alcohol, such as methanol or ethanol. The hydrogenation treatment, when employing solid catalysts, is preferably carried out with the catalyst in a fixed-bed state, although catalysts in a fluid-bed state may also be employed.

In order to supply hydrogen to the aforementioned reduction of the intermediate bimolecular nitroso compound, such mixtures may be employed as tin and hydrochloric acid; stannous chloride in hydrochloric acid; or alkaline sulfites such as sodium bisulfite. The reduction is preferably conducted, under the aforementioned temperature and pressure conditions, by adding the above-mentioned mixtures to the intermediate product in the hydrogenation reaction vessel, with the intermediate product being preferably in a finely ground condition. The resulting mixture is stirred or agitated for a time sufficient to put all the materials present into solution, or at least into complete admixture.

Following the above reduction of the intermediate bimolecular nitroso compound, there is obtained a product comprising hydrazine and the substituted ketone starting material, in solution. In order to separate hydrazine from the thus-produced reduction reaction product, the aforementioned solution is diluted with water and the resulting mixture is distilled. The distillation is conducted at temperatures effective to obtain an overhead comprising the relatively lower boiling substituted ketone starting material if a low-boiling ketone starting material were initially employed and a residue comprising hydrazine in aqueous solution. If a high-boiling ketone starting material were initially employed, it would be only partially soluble in water and an initial separation of the phases may be effected. The aforementioned residue may also be acidic, depending upon the nature of the material employed for supplying hydrogen to the aforementioned hydrogenation reaction (e. g., a hydrogen-supplying mixture comprising stannous chloride and hydrochloric acid). This residue is first neutralized if in an acid condition, employing such compounds as sodium hydroxide, potassium hydroxide, or sodium carbonate, and is then distilled. The distillate thus obtained comprises hydrazine as a product of the process, and may be further purified, if so desired, in accordance with the procedure indicated in the following example.

The following example will serve to illustrate but is not intended in any way to limit the process of the invention.

*Example*

To 114 grams (1 mol) of di-isopropyl ketone in a reactor fitted with a reflux condenser, is added 4.5 mols of concentrated hydrochloric acid. The mixture is maintained at a temperature of about 50° C. and the theoretical quantity of ethyl nitrite is added during a period of about 1½ hours. The reaction mixture turns green. The resulting product is chilled to 0° C. and allowed to crystallize out the corresponding bimolecular nitroso compound in a 32% yield of the theoretical yield (45.8 grams).

28.6 grams (0.1 mol) of the bimolecular nitroso compound is added slowly to a vigorously stirred solution of 85 grams SNCO₂·2H₂O in 125 volumes of concentrated hydrochloric acid, keeping the temperature below 20° C. This solution is stirred for 4 hours until no solid residue remains. The resulting solution is poured into water, and regenerated ketone is distilled off as water azeotropes. The residue is made strongly alkaline and is distilled to obtain a mixture of hydrazine and water. The hydrazine yield is found to be 2.1 grams or 67% of theoretical, based upon the quantity of bimolecular nitroso compound employed. The hydrazine is further identified by treating with benzaldehyde to yield benzalazine.

I claim:

1. A process for the manufacture of hydrazine which comprises: nitrosating a substituted ketone to produce the corresponding bimolecular nitroso ketone, said substituted ketone having the general formula

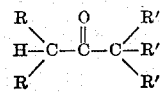

in which R and R' are substituted or unsubstituted alkyl, aryl or naphthyl groups and not more than two R' may also be a H atom subjecting the bimolecular nitroso ketone thus produced to hydrogenation to form a product comprising hydrazine and a substituted ketone having the aforementioned general formula; and separating hydrazine from said product.

2. A process for the manufacture of hydrazine which comprises: nitrosating a substituted ketone to produce the corresponding bimolecular nitro ketone, said substituted ketone having the general formula

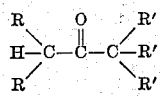

in which R and R' are substituted or unsubstituted alkyl, aryl or naphthyl groups and not more than two R' may also be a H atom subjecting the bimolecular nitroso ketone thus produced to hydrogenation at a temperature below about 35° C. and at about atmospheric pressure to form a product comprising hydrazine and a substituted ketone having the aforementioned general formula; and separating hydrazine from said product.

3. The process of claim 2 wherein said substituted ketone is di-isopropyl ketone.

4. The process of claim 2 wherein said substituted ketone is methyl isopropyl ketone.

5. The process of claim 2 wherein said substituted ketone is 1,1-diphenyl acetone.

6. The process of claim 2 wherein said substituted ketone is sym-dicyclohexyl acetone.

7. A process for the manufacture of hydrazine which comprises: nitrosating a substituted ketone to produce the corresponding bimolecular nitroso ketone, said substituted ketone having the general formula

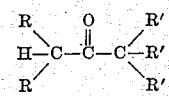

in which R and R' are substituted or unsubstituted alkyl, aryl or naphthyl groups and not more than two R' may also be a H atom subjecting the bimolecular nitroso ketone thus produced to hydrogenation at a temperature between about 0° C. and about 20° C. and at about atmospheric pressure to form a product comprising hydrazine and a substituted ketone having the aforementioned general formula; and separating hydrazine from said product.

8. A process for the manufacture of hydrazine which comprises: nitrosating di-isopropyl ketone with nitrous acid to produce a bimolecular nitroso ketone having the formula

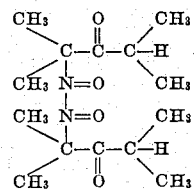

subjecting bimolecular nitroso ketone thus produced to hydrogenation at a temperature between about 0° C. and about 20° C. and at about atmospheric pressure to form a product comprising hydrazine and di-isopropyl ketone; and separating hydrazine from said product.

9. A process for the manufacture of hydrazine which comprises: nitrosating di-isopropyl ketone with nitrous acid to produce a bimolecular nitroso ketone having the formula

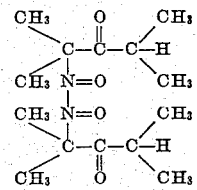

subjecting the bimolecular nitroso ketone thus produced to hydrogenation with a reducing solution comprising stannous chloride and concentrated hydrochloric acid in a mol weight ratio of about 1:10 at a temperature between about 0° C. and about 20° C. and at about atmospheric pressure to form a product comprising hydrazine and di-isopropyl ketone; and separating hydrazine from said product.

10. A process for the manufacture of hydrazine which comprises: nitrosating a substituted ketone in the presence of an inert solvent to produce a mixture comprising the corresponding bimolecular nitroso ketone, said substituted ketone having the general formula

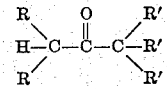

in which R and R' are substituted or unsubstituted alkyl, aryl or naphthyl groups and not more than two R' may also be a H atom cooling said mixture to separate crystals containing said bimolecular nitroso ketone; subjecting the crystals thus separated to hydrogenation to form a product comprising hydrazine and a substituted ketone having the aforementioned general formula; and separating hydrazine from said product.

11. A process for the manufacture of hydrazine which comprises: nitrosating di-isopropyl ketone with nitrous acid in the presence of chloroform to produce a mixture comprising a bimolecular nitroso ketone having the formula

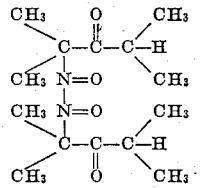

cooling said mixture to form a solid phase comprising crystals of said bimolecular nitroso ketone and a liquid phase comprising solvent; separating crystals containing said bimolecular nitroso ketone from said liquid phase; subjecting the crystals thus separated to hydrogenation with a reducing solution comprising stannous chloride and concentrated hydrochloric acid in a mol weight ratio of about 1:10 at a temperature between about 0° C. and about 20° C. and at about atmospheric pressure to form a product comprising hydrazine and di-isopropyl ketone; and separating hydrazine from said product.

ERNEST SOLOMON.

No references cited.